United States Patent [19]

Faloutsos et al.

[11] Patent Number: 5,758,338
[45] Date of Patent: May 26, 1998

[54] METHOD FOR CHARACTERIZING INFORMATION IN DATA SETS USING MULTIFRACTALS

[75] Inventors: Christos Faloutsos, Silver Spring; Yossi Matias, Potomac, both of Md.; Abraham Silberschatz, Summit, N.J.

[73] Assignee: Lucent Technologies Inc., Murray Hill, N.J.

[21] Appl. No.: 704,040

[22] Filed: Aug. 28, 1996

[51] Int. Cl.⁶ .................................................. G06F 17/30
[52] U.S. Cl. .................................................. 707/6
[58] Field of Search .................................................. 707/6

[56] References Cited

U.S. PATENT DOCUMENTS

| | | | |
|---|---|---|---|
| 5,307,292 | 4/1994 | Brown et al. | 364/564 |
| 5,456,690 | 10/1995 | Duong-Van | 607/5 |
| 5,471,991 | 12/1995 | Shinnar | 128/705 |

OTHER PUBLICATIONS

Y.E. Ioannidis et al., "Optimal Histograms for Limiting Worst-Case Error Propagation in the Size of Join Results", *ACM Trans. Database Sys.*, vol. 18, No. 4, pp. 709–748 (1993).

H.O. Peitgen et al. "Chaos and Fractals: New Frontiers of Science", Springer–Verlog New York Inc. (1992).

*Primary Examiner*—Thomas G. Black
*Assistant Examiner*—John C. Loomis
*Attorney, Agent, or Firm*—Robert E. Rudnick

[57] ABSTRACT

The invention concerns a method for estimating characteristic information of data items in a data set, such as a database, based on parameters of a multifractal distribution. The invention facilitates efficient estimation of such characteristic information of data contained in a data set more accurately than known estimation methods and without requiring an exhaustive analysis of the data. The invention also concerns an efficient technique for generating the parameters for the multifractal distribution.

16 Claims, 4 Drawing Sheets

METHOD FOR CHARACTERIZING INFORMATION IN DATA SETS USING MULTIFRACTALS

FIELD OF THE INVENTION

The invention relates to the characterization of information in data sets, such as databases.

BACKGROUND OF THE INVENTION

It is often desirable to obtain characteristics about the distribution of data stored in databases. For instance, useful characteristics of a sales database includes the number of types of products or services that sold for greater than a particular amount, the number of distinct product or service types that account for a particular percentage of sales, and particular characteristics of subsets/supersets of sales information. One known method for determining such information would be to sort through the database each time such characteristic information is requested. However, often times databases are very large. Accordingly, since all database entries would need to be accessed to determine the needed characteristics, such systems would disadvantageously be relatively slow to execute operations and would require an undesirably large amount of memory to process the information requests.

As a consequence, more recent database systems have predicted such characteristic information based on high-biased histograms maintained for the respective databases. A high-biased histogram is a representation, such as a graph or list, of a particular number of the most frequently occurring categories of items in a data set. The most frequently occurring categories of items are advantageously determined by a count associated with each item category wherein the larger the count, the more frequently occurring that category of items. For example, a high-biased histogram can be used to represent a list of the ten top selling types of products for a business and the amount of sales for each of such products. High-biased histograms and their generation are described in Y. E. Ioannidis and S. Christodoulakis, "Optimal Histograms for limiting Worst-Case Error Propagation in the Size of Join Results," *ACM Trans. Database Sys.*, vol. 18, No. 4, pp. 709–748 (December 1993). Commercially available database systems, such as Dbase II®, have the ability to generate or report high-biased histograms.

In predicting requested characteristic information, known methods have relied on a uniform assumption of the item counts in categories not maintained in the high-biased histogram, e.g., the sales of product types not maintained in the high-bias histogram are assumed to be essentially the same. However, the distribution of items in typical databases over respective categories is usually skewed and not uniform. As a consequence, the known predictions for estimating requested characteristic information are relatively inaccurate.

Accordingly, a need exists for an enhanced estimation of such characteristic information with improved accuracy.

SUMMARY OF THE INVENTION

The invention is based on the realization that typical distributions of items in data sets, such as databases, tend to be skewed in a manner that can be substantially represented as a multifractal distribution. Multifractal behavior has been observed in the distribution of database entries for sales patterns, employee salaries, names in telephone directories, occurrences of distinct words in documents and books, and lists of calculated or measured data. Accordingly, a first aspect of the invention provides a method for estimating characteristic information related to distribution of data items in a data set based on parameters of a corresponding multifractal distribution. Such a method can predict a variety of different types of characteristic information with enhanced accuracy relative to the uniform distribution assumption of known database processing techniques.

Exemplary types of characteristic information that are determinable based on the multifractal distribution according to the invention include estimates for subsets, e.g., the number of distinct products involved in sales that exceed $500; extrapolation of supersets, e.g., the number of distinct products sold internationally based on domestic sales data; median and percentiles, e.g., the number of distinct products that account for 50% or 90% of sales, respectively; and estimates of the self-joins selectivity or estimates of the second frequency moment which can be used to estimate, for example, categories with substantially the same number of entries.

In accordance with a second aspect of the invention, parameters representing a multifractal distribution used for estimating the needed characteristic information can be determined substantially based on a limited number of data set attributes, such as the amount of items in the data set, the amount of categories for the data items and the number of items in a single category having a substantially largest number of items. In the alternative, such parameters can be based on the total number of items in the data set, the number of categories for the items and a high-biased histogram containing a count of items of at least one category.

The invention facilitates efficient estimation of characteristic information of the distribution of data items contained in a data set more accurately than known estimation methods and without requiring an exhaustive analysis of the data. Further, such estimation can advantageously typically be performed without requiring relatively large amounts task memory.

Additional features and advantages of the present invention will become more readily apparent from the following detailed description and accompanying drawings.

BRIEF DESCRIPTION OF THE BRIEF

Figure 1:
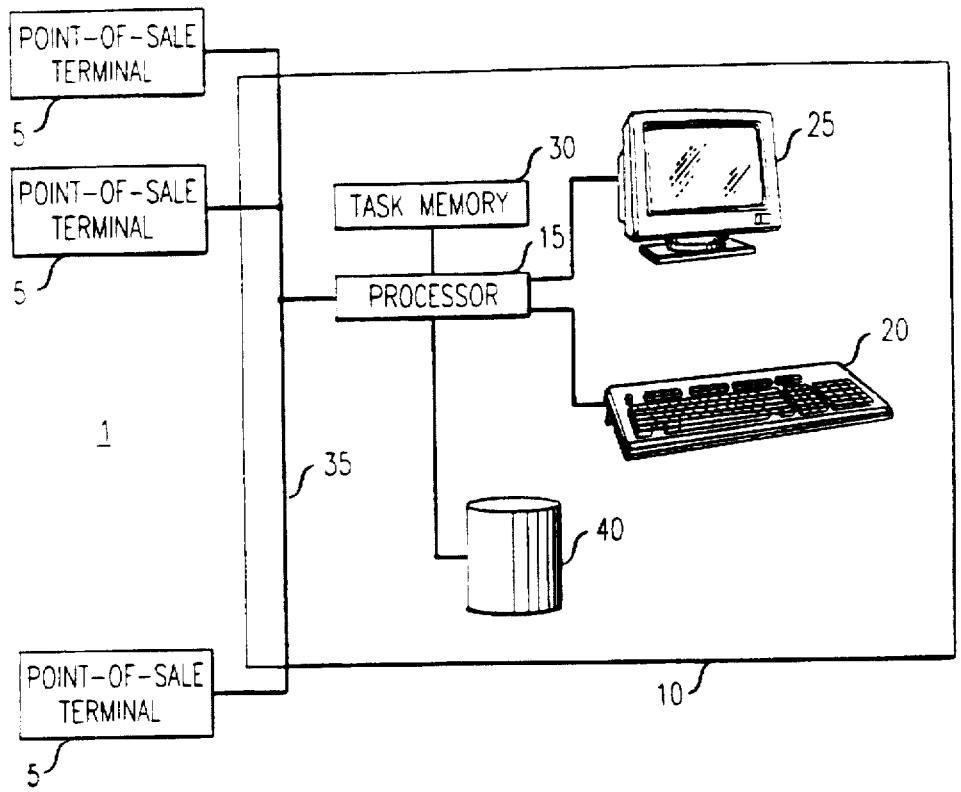
FIG. 1 illustrates a schematic block diagram of an exemplary database system for practicing the present invention.
Figure 4:
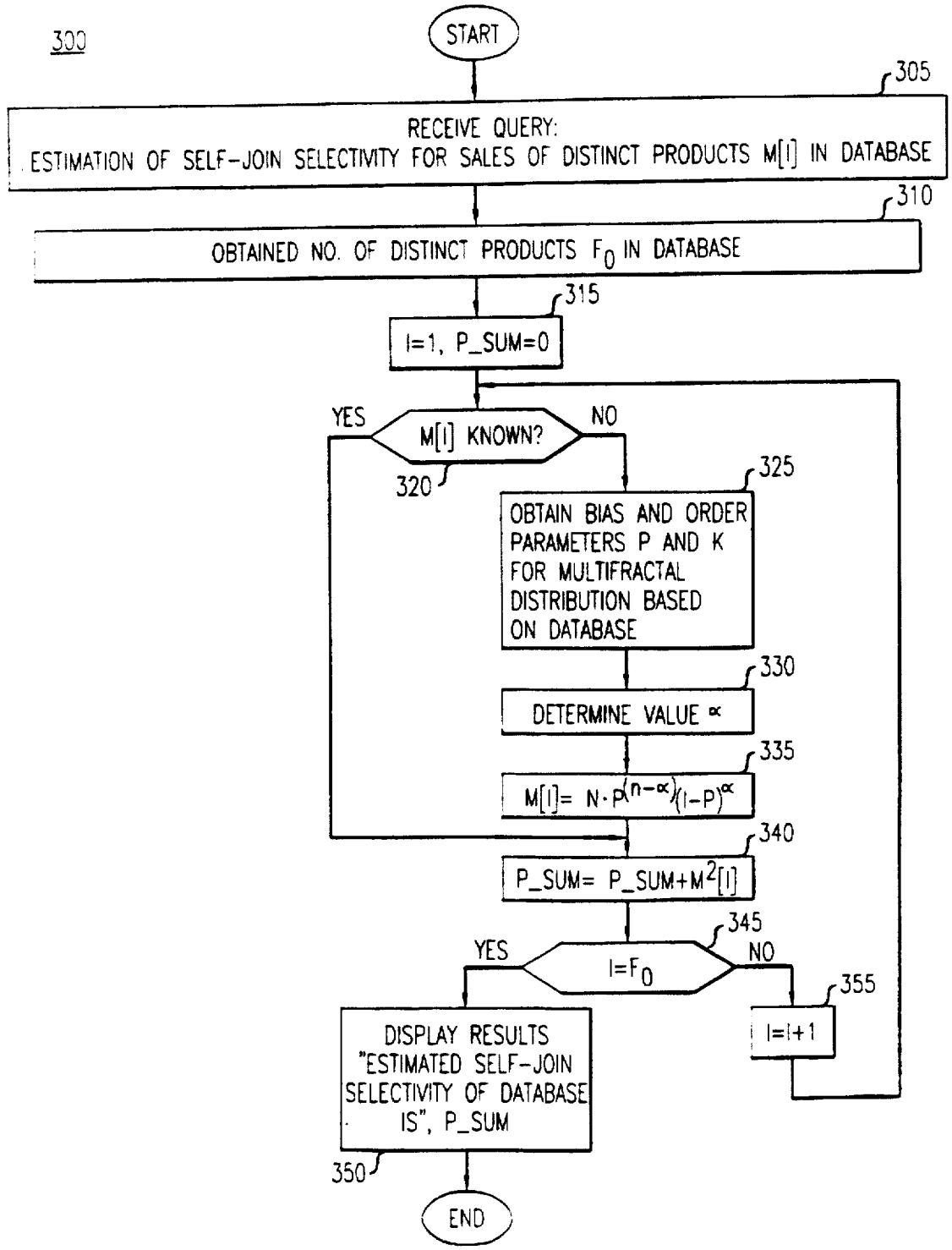
Figure 5:
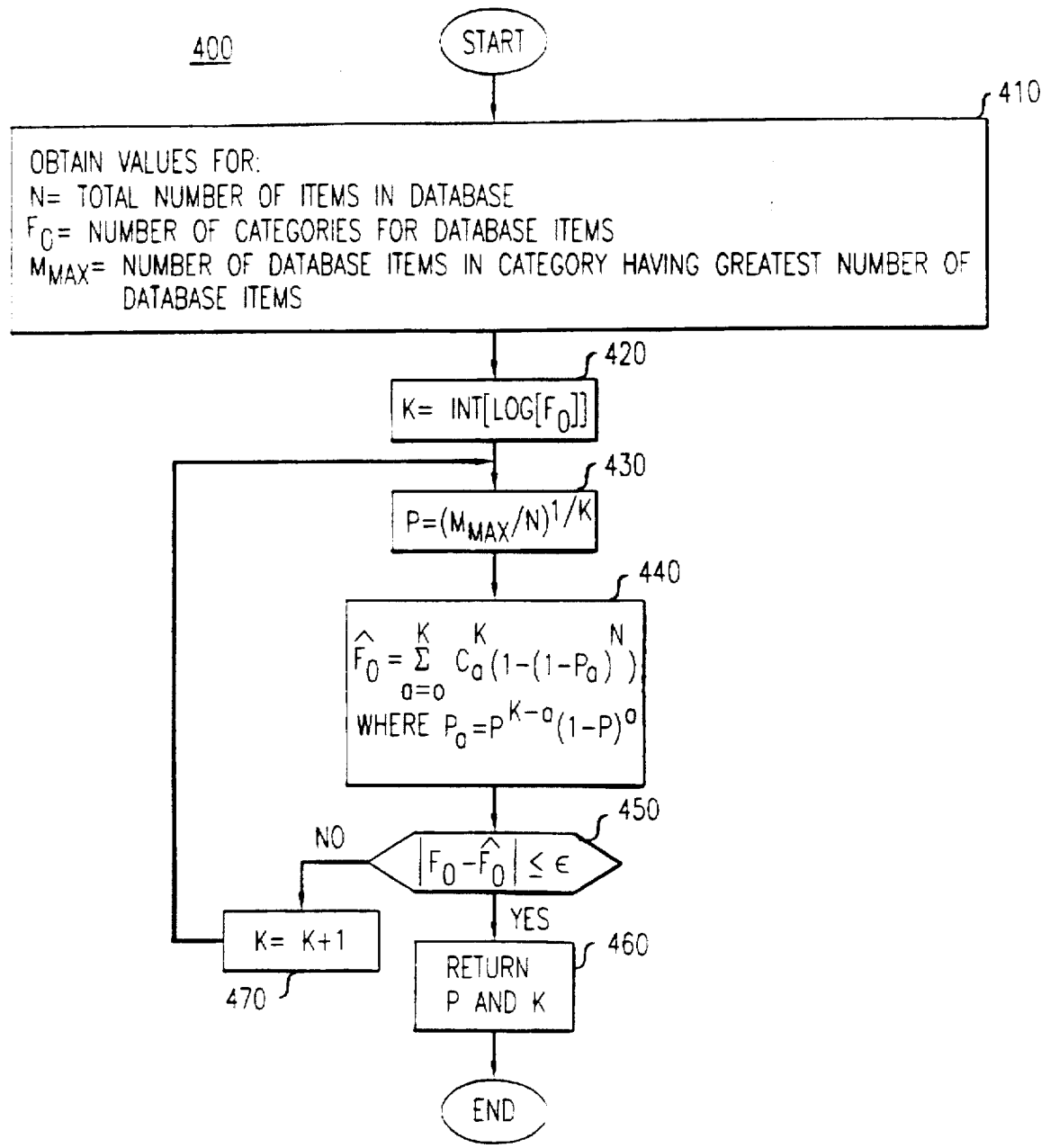

FIG. 4 illustrates a flow diagram of an exemplary method for estimating characteristics of self-join selectivity of data in the database of FIG. 1 in accordance with the invention; and FIG. 5 illustrates a flow diagram of an exemplary method for determining bias and order parameters representing a multifractal distribution based on a limited number of attributes of the database of FIG. 1 in accordance with the invention.

DETAILED DESCRIPTION

A first aspect of the invention is directed to a method that uses parameters of a multifractal distribution for estimating characteristic information of the distribution of data items in a data set. A data set can be a general organization of data including lists or arrays of information and databases. A second aspect of the invention concerns an efficient technique for determining appropriate multifractal parameter values to provide an estimate of the distribution of a corresponding data set based on a relatively small number of attribute values of the data set. Attribute values of a data set are those values that are typically maintained for data sets that provide some characteristic information of the data set including, for example, the total number of items in the data set, the number of categories for classifying such items or a high-biased histogram of the most frequently occurring categories of items in the data set.

The invention is described below with regard to an exemplary relational database of product sales for illustration purposes only and is not meant to be a limitation of the invention. Distributions that tend to be skewed in a manner approximated by multifractals have been observed in commodities, such as water, gold, silver, distribution on earth, and photon distribution is physics. Also, such distribution behavior has been observed in financial data and salary distributions, occurrences of names in telephone directories and distinct words in documents and books, and lists of measured and calculated data. Accordingly, this invention is also useful for estimating characteristic information of data sets of such types or other data whose distribution can be approximated by multifractals.

An exemplary centralized system 1 for monitoring sales transactions that employs a method in accordance with the invention is shown in FIG. 1. It is possible for the system 1 to monitor sales transactions of, for example, a department store or supermarket. The system 1 includes a set of point-of-sale terminals 5, such as cash registers located throughout the department store, connected to database system 10. The point-of-sale terminals 5 transmit information to the database system 10 regarding each transaction executed at the respective terminal 5. The database system 10 includes processor 15 coupled to a keyboard 20, display device 25 and task memory 30. The processor 15 is further coupled to a communication bus 35 which is coupled to the point-of-sale terminals 5 and main memory 40 which maintains a data set of product sales in the form of a database.

In operation, the processor 15 updates data of the sales database in the main memory 40 based on information received from the point of sale terminals 5. Typically, data is maintained in the system's database of sales of distinct products. The task and main memory 30 and 40 are implemented using mediums for storing information such as, for example, magnetic disk storage devices, magnetic tape and random access memory (RAM). The use of magnetic disk storage devices for the main memory is advantageous for maintaining a database with large amounts of data. It is generally advantageous to employ RAM for the task memory. The processor 15 also responds to queries from users regarding data stored in the main memory 40. In responding to queries, the processor 15 executes instructions loaded into the task memory 30. It is also possible for the instructions executed by the processor 15 to be stored in the main memory 40, or read-only-memory (ROM) associated with the processor or down loaded over the bus 35. Although the processor 15 in FIG. 1 processes user queries and updates the database with data from the point-of-sale terminals, it should be readily understood that such operations can be performed by separate processors.

The keyboard 15 enables users to enter queries for reading by the processor 15 and the display 15 displays representations of the information in response to such queries. The database system 10 can be implemented using a personal computer and appropriate peripheral devices. Also, the database system 10 can be implemented in a distributed system in which components of the system, such as the memories and processors, are networked together.

User queries often concern characteristic information based on a distribution of data items over several known classifications or categories. For instance, the classification of products into categories can include respective distinct product or service types or more general categories such as men's shoes, housewares, women's dresses, or classification based on the sale price such as the ranges of 0 to $100, $100 to $200 and $200 to $500. These examples are for illustrative purposes and not meant to be a limitation on the invention. It is also possible to categorizes such data items based on a large variety of different other types of categories. Since particular databases tend to be quite large, it is typically disadvantageous to scan through each item in the database to determine a distribution in response to every user query. As a consequence, it is often more advantageous to determine an estimate of the distribution based on a smaller number of particular characteristics of the database, such as a high-biased histogram of particular item categories for the database.

The first aspect of the invention employs parameters of a multifractal distribution approximating the distribution of items in the data set to estimate characteristic information of the data set with enhanced accuracy. This aspect of the invention is described with respect to exemplary queries relating to estimates of subsets/supersets, medians and percentiles, and self-join selectivity in FIGS. 2 to 4, respectively. These exemplary queries are for illustration purposes and is not meant to be a limitation of the invention. Other distribution-related queries for which the invention can be employed include, for example, high order frequency moments, and the extent of entropy of the distribution of the data set.

A multifractal distribution is a particular skewed distribution which can be generated as a recursive distribution of probabilities. The classification of a particular data item into a category can be viewed as a probabilistic binary decision tree of depth K with a probability P of taking a first particular branch from a tree node and a probability (1−P) of taking a second branch. The parameters values P and K are referred to as the bias and order of the multifractal distribution, respectively. For a binomial multifractal distribution, it is assumed there are K-choose-α or $C_\alpha^K$ combinations of attribute values for which the expected relative frequency is $P^{(K-\alpha)}(1-P)^\alpha$, such that the distinct expected frequency values occurs M times, where $M = N \cdot P^{(K-\alpha)}(1-P)^\alpha$, and where the value α can be determined from the expression:

$$\sum_{b=0}^{\alpha-1} C_b^K < I \leq \sum_{b=0}^{\alpha} C_b^K,$$

where I is the rank of the respective data category. Multifractal distributions and their generation are described in greater detail in H. O. Peitgen, H. Juergens, and D. Saupe, *Chaos and Fractals: New Frontiers of Science*, (Springer-Verlag New York Inc., 1992), which is incorporated by reference herein.

An exemplary estimation of characteristic information based on parameters of a multifractal distribution is described below with respect to the methods of FIGS. 2 through 4. Also, an efficient technique for determining appropriate bias and order parameter values P and K for representing a multifractal distribution in accordance with a second aspect of the invention is described below with regard to FIG. 5. The generation techniques provided below are illustrative and not meant to be a limitation of the invention. Other suitable method can be used to generate a multifractal distribution and its bias and order parameters P and K for use in accordance with the invention.

Figure 2:
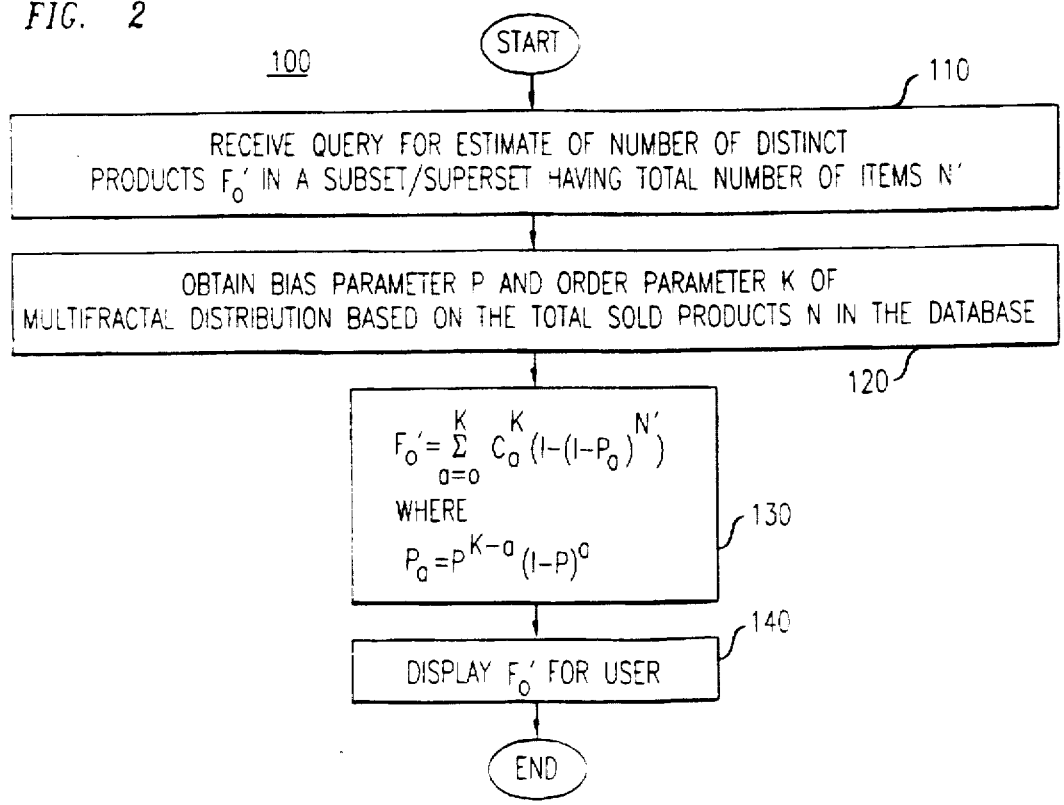
FIG. 2 illustrates a flow diagram of an exemplary method for estimating characteristics for subsets and supersets of data in the database of FIG. 1 in accordance with the invention.

An exemplary method 100 for estimating the number of distinct data item types, e.g., number of types of products sold, in a particular subset or superset is shown in FIG. 2. In the method 100, the query for the estimate of products sold in a subset or superset is received in step 110. Exemplary subsets can be those data items represent products sold for greater than $100, or those items classified as housewares. An exemplary superset can be for an estimate for the number of types of products sold internationally based on a database for domestic sales. In each of the previously listed subset and superset examples, the total number of products sold N' is often maintained for such subsets and supersets of interest. Alternatively, the attribute value N' can be determined by other conventional techniques.

After the query is received with the attribute value N' in step 110, the bias and order parameter values P and K for the multifractal distribution are obtained in step 120. Such values can be obtained according to the efficient method described below with regard to FIG. 5 or by other techniques such as, for example, techniques substantially based on the previously described recursive distribution of probabilities for estimating multifractal distributions. Then, in step 130, the estimate for the number of distinct product types sold $F_0$ is determined based on a determined multifractal distribution with the bias and order parameter P and K according to the expression:

$$F_o = \sum_{a=0}^{K} C_a{}^K (1 - (1-P_a)^{N'}),$$

where $P_a = P^{(K-a)}(1-P)^a$ and $C_a{}^K = \binom{K}{a} = \frac{K!}{(K-a)!}$ .

The resulting estimate value $F_0$ of the number of distinct types of data items in the subset or superset is then displayed on the display 25 for the user in step 140.

Figure 3:
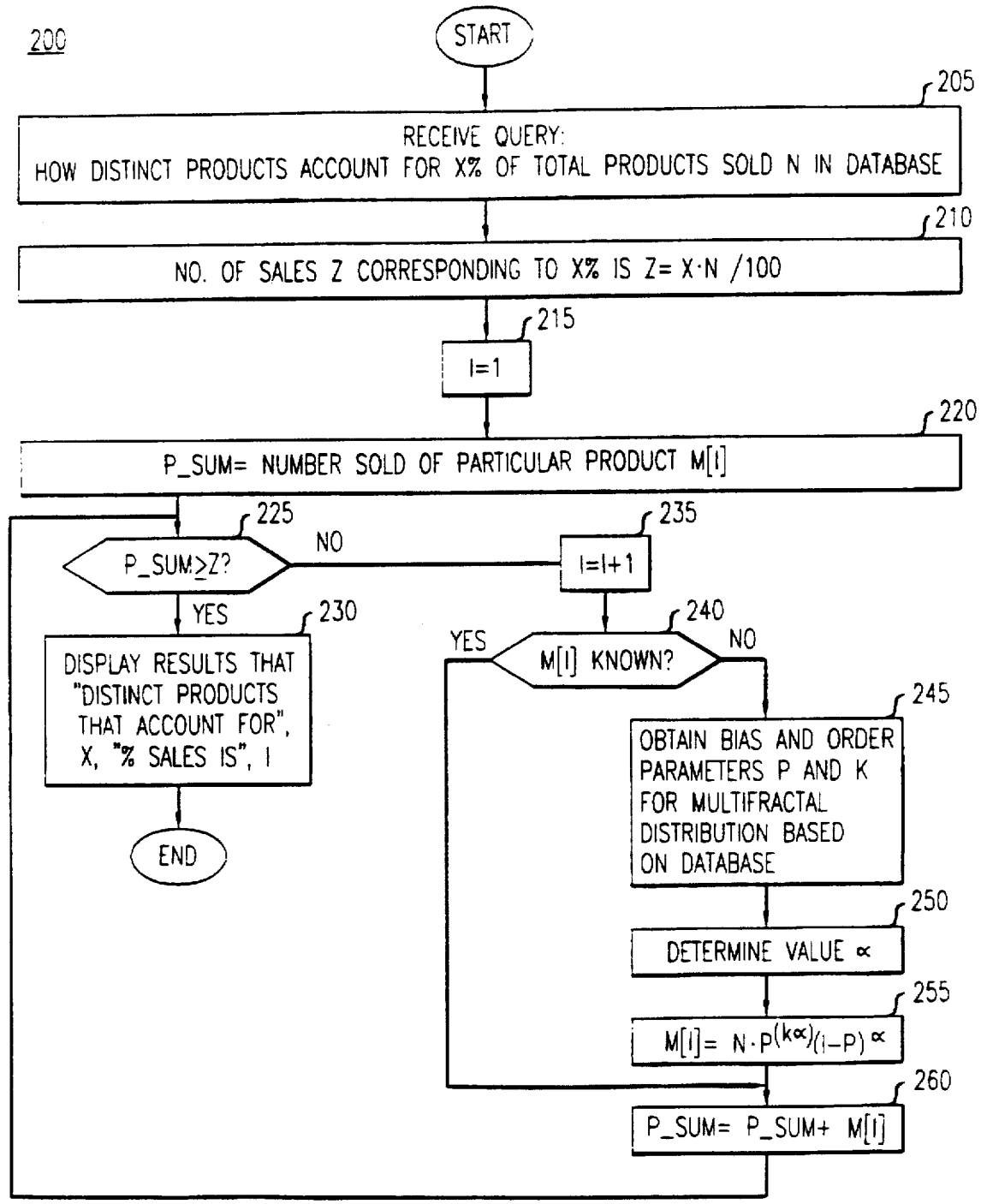
FIG. 3 illustrates a flow diagram of an exemplary method for estimating median and percentile characteristics for data in the database of FIG. 1 in accordance with the invention.

FIG. 3 illustrates a method 200 for responding to a query for determining the amount of product types that constitute a particular percentile or the median of product sales. In FIG. 3, the query is received in step 205 to estimate the number of distinct product types that account for X% of the total product sales N in the database. The total number of products sold N corresponds to the first frequency moment $F_1$ of the data set which is an attribute value typically maintained by conventional database management systems such that a time consuming scan of the database entries is not required.

The number of products sold Z corresponding to X% of total sales N is then determined in step 210 and an integer I is set to 1 in step 215. Then, in step 220, a partial sum P_SUM is set to a data set array value M[I] or M[1]. The data set array M[x] characterizes the number of sales of each product type as a respective entry denoted by x in an array M[x] with those products with the substantially larger sales having a lower entry value x than those product types with the substantially lower sales. Accordingly, the value at the data set array position M[1] corresponds to the numbers of sales of the product with the substantially largest number of sales.

The value M[1] can be obtained from a high-biased histogram which can be generated in a conventional manner.

Methods for generating high-biased histograms are known in the art and include those described in Y. E. Ioannidis and S. Christodoulakis, "Optimal Histograms for limiting Worst-Case Error Propagation in the Size of Join Results," *ACM Trans. Database Sys.*, vol. 18, No. 4, pp. 709–748 (December 1993), which is incorporated by reference herein. Commercially available database systems, such as Dbase II®, have the ability to generate or report high-biased histograms.

Typically, a database is not scanned to produce a high-biased histogram every time a query is entered due to the excessively large sizes of most databases. A high-biased histogram is often generated intermittently, such as periodically or at every n-th query. Thus, the value M[1] used in accordance with the method 200 can be a previously determined value despite the intermittent updating of the database with data from the point-of-sale terminals 5, shown in FIG. 1. As a consequence, the value M[1] obtained from a high-biased histogram may not correspond to the exact largest number of sales for a particular product type. However, in such instances, although such product type may actually have the second largest number of sales, it should be sufficiently close to the largest number of sales for use by this technique if the high-biased histogram is updated at a sufficiently frequent basis.

After the value P_SUM is set to the value M[1] in step 220, the method 200 proceeds to step 225. In step 225, if the value P_SUM is greater than or equal to the number of desired of percentile sales Z the method 200 proceeds to step 230, otherwise it proceeds to step 235. If the value P_SUM is less than the value Z, then the method 200 identifies or estimates the number of sales for the distinct product that had substantially the next highest sales in steps 235–255 and adds that to the partial sum P_SUM in step 260 before returning to step 225 to test again if increased value P_SUM is greater than or equal to the number of desired of percentile sales Z. However, if the value P_SUM is greater than or equal to the number of desired of percentile sales Z in step 225, then the method 200 has identified that the distinct product type, i.e., the I-th product in the distribution of the data set M, that is the Z-th product sold. As a consequence, the method 200 proceeds to step 230 for displaying that the number of product types of the value I accounts for X% of the products sold.

The method 200 identifies or estimates the number of sales for the product type that had substantially the next highest sales in the following manner in steps 235–255. The integer I is incremented in step 235, and then, in step 240, if the data set value M[I] is known, such as from the high-biased histogram, the method 200 proceeds to step 260 where the partial sum P_SUM is increased. Conventional high-biased histograms are often maintained with attribute values of the products sold for the first several most sold products. However, if the value M[I] is not known in step 240, the method 200 proceeds to step 245. In step 245, the bias parameter P and order parameter K are obtained that represent a multifractal distribution approximating the distribution of the data set. The distribution bias and order parameters P and K can be generated in the manner described below with regard to FIG. 5 or using another technique as previously described with respect to step 120 in FIG. 2. Then, in step 250, the corresponding value α is determined. It is possible to determine the value α according to the expression:

$$\sum_{b=0}^{\alpha-1} C_b{}^K < I \leq \sum_{b=0}^{\alpha} C_b{}^K.$$

The value $\alpha$ is then used, in step 255, to estimate the value M[I] based on the obtained multifractal parameters P and K. This value M[I] is then used to update the partial sum P_SUM in step 260 before returning to step 225. As previously described, in step 225, the partial sum P_SUM is evaluated to determine if the Z-th percentile of sales has been reached before proceeding to the reporting step 230.

An exemplary method 300 for estimating the self-join selectivity of a data set, i.e., the second frequency moment, is shown in FIG. 4. The method 300 of FIG. 4 employs a technique substantially similar to that used in the method 200 of FIG. 3. The self-join selectivity characterizes the extent of non-uniformity of a distribution and facilitates the determination of a variety of statistical characteristics of the data in a data set. In particular the self-join selectivity is the summation of the squares of the numbers of distinct products sold. Moreover, the self-join selectivity directly characterizes the number of pairs of distinct products that have substantially the same number of product sales.

In FIG. 4, a query for estimating the self-join selectivity of the sales data set is received in step 305. The attribute values of the number of product types J maintained in the data set is obtained in step 310. The attribute value J is typically known when the data set is configured or is a value routinely maintained by conventional databases. Then, in step 315, an integer I and a partial sum P_SUM are set to one and zero, respectively. The method 300 then identifies or estimates the value M[I] in steps 320 through 335 in a substantially identical manner as that previously described for steps 240 through 255 in FIG. 3. As is also previously described with respect to FIG. 3, the data set array M[x] characterizes the number of sales of each product type as an entry denoted by x with an ordering such that the substantially larger sales having a lower entry value x than those products with substantially lower sales.

Referring again to FIG. 4, after identifying or estimating the value M[I] in steps 320–335, the method 300 updates the partial sum P_SUM with the square of the value M[I] in step 340. Then, in step 345, if the integer I equals the number of product types, the method 300 has completed the estimation of the summation of the square of the numbers of distinct products sold in the sum P_SUM, and the results are then displayed for the user in step 350. However, if the integer I is unequal to the value $F_0$, then the method 300 increments the integer I, in step 355, determines the next corresponding M[I] in steps 320–335 and updates the partial sum P_SUM in step 340. The integer I is incremented and the steps 320–340 are repeated until the self-join selectivity sum is determined based on all the M[I] values and the result is displayed in step 350.

FIG. 5 illustrates an exemplary method 400 for determining the bias parameter P and order parameter K of a multifractal distributions according to the invention for estimating the corresponding distribution of data in a data set. More specifically, steps 120, 245 and 325 of FIGS. 2, 3 and 4, respectively, require determination of the bias and order parameters P and K. Although it is possible to determine these values other methods, they can advantageously be determined based on a reduced number of data set attributes according to the method 400 in FIG. 5.

In FIG. 5, the three attribute values needed to obtain the bias and order parameter values P and K are obtained in step 410. The needed values are the total number of items in the database N, e.g., the total number of products sold; the number of categories of distinct data items $F_0$, e.g., the number of product types sold; and the number of database items $M_{MAX}$ classified in the particular category in which the substantially largest number of data items or product sales are classified. The total number of items in the database N is typically maintained in conventional databases such that a time consuming scan of the database entries is not required. Similarly, the value $M_{MAX}$ is often maintained by conventional databases in the form of a high-biased histogram and corresponds to the value M[1] in the previously described methods 200 and 300 of FIGS. 3 and 4, respectively. The number of categories of distinct data items $F_0$, corresponding to the different types of products sold, is often known when the database is created or maintained during operation of the database.

An initial relatively low parameter value for the order K is then determined in step 420 as the integer portion of the value $\log[F_0]$. A corresponding estimate of the bias parameter P is then determined based on the initial value K in step 430. Then, in step 440, a corresponding estimated number of categories $\hat{F}_0$ is determined based on the estimated bias and order values. The computed estimate and obtained values $\hat{F}_0$ and $F_0$ are then compared in step 450 and if the difference is less than or equal to a tolerance value $\epsilon$, the method 400 proceeds to step 460 where the estimated values for P and K are provided for use by other corresponding methods in providing the desired statistical information for the data set based on a multifractal distribution.

However, if the difference between the values $\hat{F}_0$ and $F_0$ are greater than the tolerance value $\epsilon$, the method 400 proceeds to step 470 where the order parameter K is incremented and the method 400 returns back to steps 430 and 440 for recomputation of the corresponding bias value P and the estimated number of categories $\hat{F}_0$. The recomputed value $\hat{F}_0$ is then tested again in step 450. The method 400 repeats the steps 470, 430 and 440 until the tolerance between the obtained and computed estimate of values $F_0$ and $\hat{F}_0$ is equal to or less than the value $\epsilon$. Thus, in this manner, the method 400 produces relatively accurate bias and order parameter values P and K for estimating a corresponding multifractal distribution based on a small number of database parameters. The exact value employed for the tolerance value $\epsilon$ is based on any corresponding variation acceptable in the estimated distribution, for determining the characteristic information, from the actual distribution. It should be understood that the larger the tolerance value $\epsilon$ the greater the likelihood that the estimated characteristic information would deviate to a larger extent from the actual data distribution.

Although several embodiments of the invention have been described in detail above, many modifications can be made without departing from the teaching thereof. All of such modifications are intended to be encompassed within the following claims. The invention is not intended to be limited to product sales data sets and can be employed with a variety of different types of data sets including, for example, financial data sets, salary and/or other employee information data sets, telephone directory data sets and lists of calculated or measured data whether experimental or otherwise.

The invention claimed is:

1. A computer-implemented method for determining characteristic information relating to a distribution of data items in a data set comprising the steps of:

estimating parameters representing a multifractal distribution based on attributes of said data set; and determining said distribution-related characteristic information based on said estimated multifractal parameters.

2. The method of claim 1 wherein said estimating step further comprises:

obtaining first attribute values corresponding to a substantially total number of items in said data set and a number of categories into which said items can be classified; and obtaining at least one second attribute value corresponding to substantially the number of data items classified into at least one respective category having substantially the largest number of data items.

3. The method of claim 2 wherein said step of obtaining said second attribute value obtain a value corresponding to substantially the number of data set items classified into the category having substantially the largest number of items.

4. The method of claim 2 wherein said steps of obtaining first and second attribute values comprises the step of estimating at least one of said values.

5. The method of claim 2 wherein said step of obtaining said second attribute value comprises retrieving said value from a high-biased histogram associated with said data set.

6. The method of claim 1 wherein said estimating step estimates multifractal bias and order parameters.

7. The method of claim 1 wherein said distribution-related characteristic information is an estimation of a number of categories in a subset or superset of data items and wherein said determining step further comprises:

obtaining an attribute value of substantially a total number of data items in said subset or superset; and determining said distribution-related characteristic information based on said estimated multifractal parameters and said obtained subset or superset attribute values.

8. The method of claim 1 wherein said statistical distribution-related characteristic information is identifying an amount of categories corresponding to a particular percentile of said data set items and wherein said determining step further comprises:

determining a number of data set items that substantially correspond to the desired percentile;

obtaining at least one attribute value of substantially the number of data set items classified into at least one respective category having substantially the largest amount of items; and sequentially updating a sum value by summing said obtained at least one attribute value with an estimation of numbers data items classified into respective categories having substantially the next largest number of items based on said multifractal distribution parameters until said sum value is equal to or greater than said determined number of data set items for the desired percentile, wherein a corresponding number of categories to achieve such sum is said desired amount of categories.

9. The method of claim 8 wherein said step of obtaining said attribute values comprises retrieving said values from a high-biased histogram associated with said data set.

10. The method of claim 1 wherein said statistical information corresponds to a self-joins selectivity of said data set and wherein said determining step further comprises sequentially updating a sum value by summing a square of the number of data set items classified into the respective categories, wherein said number of items in each category can be either an obtained attribute value or estimated based on said multifractal distribution parameters from said estimating step.

11. The method of claim 10 wherein said obtained attribute values are retrieved values from a high-biased histogram associated with said data set.

12. The method of claim 1 wherein said step of estimating said multifractal parameters estimates bias parameter P and order parameter K and further comprises:

(a) determining an initial integer value for said order parameter K;

(b) determining a value for the bias parameter P based on said order parameter K and attribute values of said data set;

(c) determining an expected number $\hat{F}_0$ of categories of data items in said data set;

(d) increasing the value of the order parameter K and repeating steps (b) (c) and (d), if a difference in the expected number of categories $\hat{F}_0$ and a known number of categories $F_0$ is greater than a tolerance value.

13. The method of claim 12 wherein said initial value of the order parameter K is an integer determined based substantially on the known number of categories $F_0$ of data items in said data set.

14. The method of claim 13 wherein said initial integer value of the order parameter K is determined corresponding to the integer portion of an expression: $LOG[F_0]$.

15. The method of claim 12 wherein said step of determining said bias parameter P value determines said parameter P substantially corresponding to a relationship:

$P = (M_{MAX}/N)^{1/K}$, where the value N is substantially a total number of items in the data set and the value $M_{MAX}$ is the amount of data items classified into a category with substantially the largest amount of data items.

16. The method of claim 12 wherein said step of determining said expected number of categories of data items $\hat{F}_0$ is a value substantially corresponding to a relationship:

$$\hat{F}_o = \sum_{a=0}^{K} \binom{K}{a} (1-(1-P_a)^N), \text{ where } P_a = P^{(K-a)}(1-P)^a.$$

* * * * *